(12) United States Patent
Yoshida

(10) Patent No.: US 9,902,010 B2
(45) Date of Patent: Feb. 27, 2018

(54) WELDING ROBOT MONITORING FEEDABILITY OF WELDING WIRE

(71) Applicant: FANUC CORPORATION, Yamanashi (JP)

(72) Inventor: Shigeo Yoshida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/059,704

(22) Filed: Mar. 3, 2016

(65) Prior Publication Data

US 2016/0263710 A1   Sep. 15, 2016

(30) Foreign Application Priority Data

Mar. 10, 2015   (JP) .................. 2015-047656

(51) Int. Cl.
| | |
|---|---|
| B23K 37/00 | (2006.01) |
| B23K 9/133 | (2006.01) |
| B23K 37/02 | (2006.01) |
| B23K 11/31 | (2006.01) |
| B23K 26/08 | (2014.01) |
| B23K 9/12 | (2006.01) |

(52) U.S. Cl.
CPC ............ B23K 9/133 (2013.01); B23K 9/124 (2013.01); B23K 11/314 (2013.01); B23K 26/0884 (2013.01); B23K 37/0258 (2013.01)

(58) Field of Classification Search
CPC .............. B23K 31/12; B23K 37/0258; B23K 11/314–11/315; B23K 26/0884; B23K 9/133; B23K 9/124

USPC ......................... 74/490.01–490.06
See application file for complete search history.

(56) References Cited

U.S. PATENT DOCUMENTS

| | | | | |
|---|---|---|---|---|
| 5,637,241 A * | 6/1997 | Moates | ............... | B23K 11/256 |
| | | | | 219/109 |
| 6,668,678 B1 * | 12/2003 | Baba | ................. | B25J 9/104 |
| | | | | 414/680 |
| 7,004,373 B1 * | 2/2006 | Miller | ................. | B23K 20/004 |
| | | | | 228/103 |
| 8,809,741 B2 * | 8/2014 | Feldhausen | ........... | B23K 9/013 |
| | | | | 219/137.9 |

(Continued)

FOREIGN PATENT DOCUMENTS

| | | |
|---|---|---|
| JP | 58-157270 U | 10/1983 |
| JP | 61-97373 U | 6/1986 |

(Continued)

*Primary Examiner* — Kiley Stoner
(74) *Attorney, Agent, or Firm* — Hauptman Ham, LLP

(57) ABSTRACT

A welding robot comprising an arm having a wrist part and upper arm part rotatably connected to each other, a welding torch attached to the arm at the wrist part side, a wire feed device attached to the arm at the upper arm side, a welding cable connected to both of the wire feed device and the welding torch for holding a welding wire, a control part for controlling operation of the arm so that the welding torch is moved over a welding path, and a monitoring part for monitoring if the amount of flexure of the welding cable caused by operation of the wrist tilt axis located between the wrist part and upper arm part while the welding torch is moved over the welding path under the control of the control part is within an allowable range.

8 Claims, 8 Drawing Sheets

(56) References Cited

U.S. PATENT DOCUMENTS

| | | | | |
|---|---|---|---|---|
| 2002/0044439 | A1* | 4/2002 | Shiokawa | B21K 1/767 362/37 |
| 2004/0016788 | A1* | 1/2004 | Huismann | B23K 9/073 226/115 |
| 2005/0189335 | A1* | 9/2005 | Huismann | B23K 9/073 219/137.71 |
| 2008/0229862 | A1* | 9/2008 | Nakamoto | B25J 9/1045 74/490.04 |
| 2008/0257874 | A1* | 10/2008 | Kaufman | B23K 9/124 219/137 R |
| 2008/0296278 | A1* | 12/2008 | Meckler | B23K 9/124 219/137.71 |
| 2010/0236352 | A1* | 9/2010 | Iida | B25J 9/1045 74/490.05 |
| 2011/0015786 | A1* | 1/2011 | Kawai | A61B 1/00147 700/256 |
| 2011/0220628 | A1* | 9/2011 | Mehn | B23K 9/124 219/130.1 |
| 2012/0221146 | A1* | 8/2012 | Zhang | B25J 9/0078 700/260 |
| 2014/0027429 | A1* | 1/2014 | Chantry | B23K 9/124 219/137.7 |
| 2015/0125836 | A1* | 5/2015 | Daniel | G09B 19/24 434/234 |
| 2015/0165621 | A1* | 6/2015 | Ko | B25J 9/104 74/490.04 |
| 2015/0343552 | A1* | 12/2015 | Gelmetti | B23K 9/124 219/137.71 |
| 2016/0008905 | A1* | 1/2016 | Izawa | B25J 15/0019 219/130.1 |
| 2016/0288237 | A1* | 10/2016 | Gelmetti | B23K 9/124 |

FOREIGN PATENT DOCUMENTS

| | | | |
|---|---|---|---|
| JP | 01181975 | A * | 7/1989 |
| JP | 5-60669 | U | 8/1993 |
| JP | 2001-293574 | A | 10/2001 |
| JP | 2003-127077 | A | 5/2003 |
| JP | 2005-297069 | A | 10/2005 |
| JP | 2006-190228 | A | 7/2006 |
| JP | 2010-036253 | A | 2/2010 |

* cited by examiner

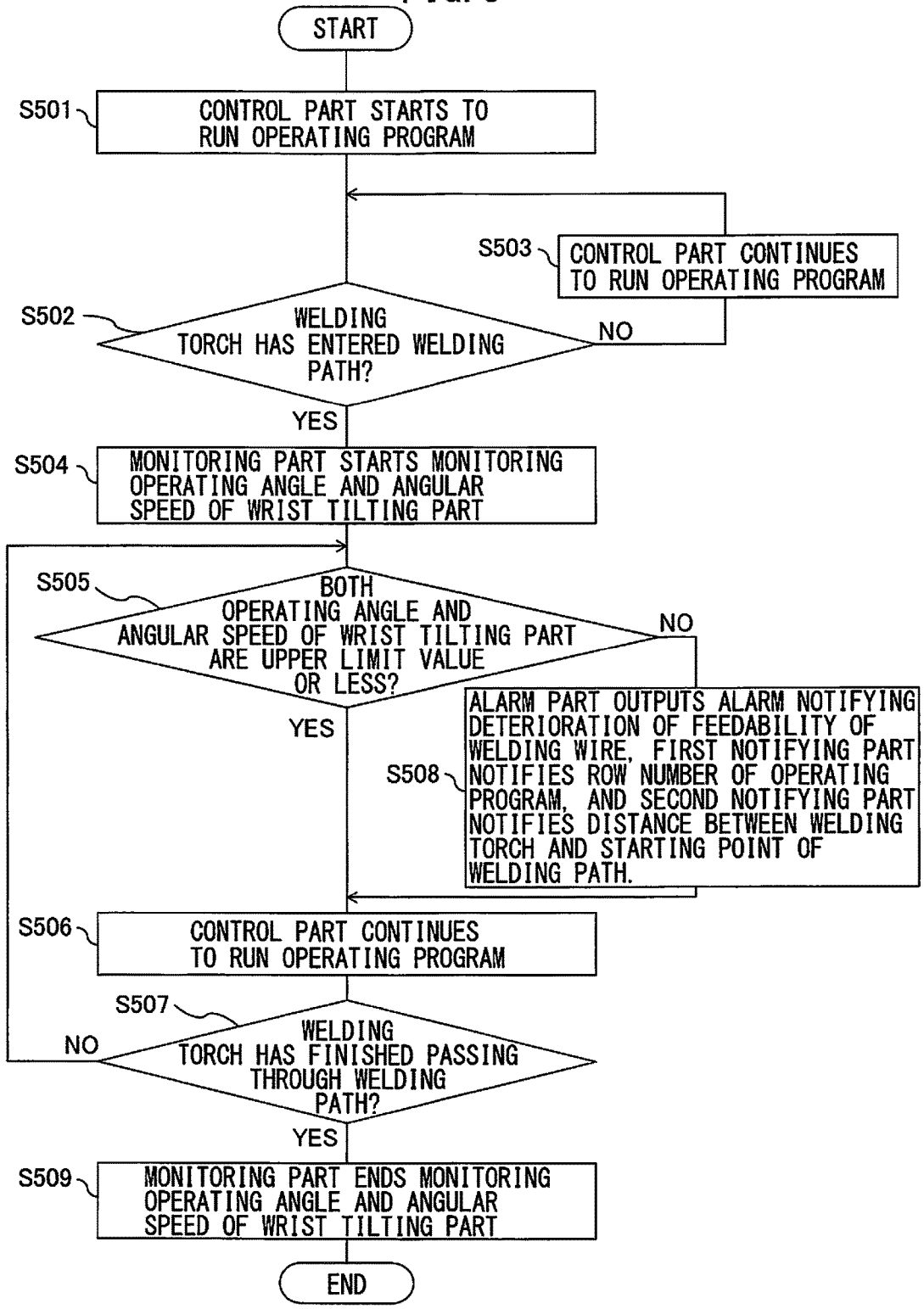

WELDING ROBOT MONITORING FEEDABILITY OF WELDING WIRE

RELATED APPLICATIONS

The present application claims priority to Japanese Patent Application Number 2015-047656, filed Mar. 10, 2015, the disclosure of which is hereby incorporated by reference herein in its entirety.

BACKGROUND OF THE INVENTION

1. Field of the Invention

The present invention relates to a welding robot which monitors the feedability of welding wire through a welding cable during execution of a welding process.

2. Description of the Related Art

A general welding robot has a welding torch which is attached to a front end part of an arm, a feed device of welding wire which is attached above a third axis of the arm, and a welding cable which connects the feed device and the welding torch. In many cases, the welding cable is laid along an outer surface of the arm with a certain extent of slack. The welding cable has a conduit cable inserted through it. While the welding process is being performed, the welding wire which is fed from the feed device runs through the conduit cable to reach the front end part of the welding torch. Further, the front end part of the welding wire which is exposed from the welding torch is melted by the high heat generated by arc discharge and bonded to the welding base materials so that the welding base materials are welded.

Incidentally, if the curvature of the welding cable becomes greater due to operation of the arm, the curvature of the conduit cable which is inserted through the welding cable also becomes larger. If the welding wire is fed in this state, the outer circumference of the welding wire will strongly rub against the inner surface of the conduit cable, and therefore the feedability of the welding wire through the welding cable deteriorates. Further, due to the damage to the outer surface of the welding wire, the weld quality is liable to fall. Furthermore, due to the inner surface of the conduit cable being abraded, early replacement of the welding cable is required.

To avoid this situation, JP2005-297069A proposes a welding robot where a wire feed device is attached to a base end part of an upper arm part, and a welding cable is stored inside of the upper arm part. In the welding robot of JP2005-297069A, the welding cable is arranged so as to extend in the longitudinal direction of the upper arm part at the inside of the upper arm part, and therefore the amount of deformation of the welding cable as a whole is suppressed. Further, JP2010-36253A proposes the approach of arranging a wire feed device below a third axis of the welding robot so as to reduce the bending of the welding cable as a whole. Further, JP2001-293574A proposes a system comprising a wire feed device which is equipped with servo motors, and a monitor device which calculates a feed resistance of the welding wire by subtracting an estimated torque component from the torque information of the servo motor.

However, even if the welding cable is stored in the upper arm part as in JP2005-297069A, the operating angle of the tilt axis can be considerably large depending on the teaching operation of the welding robot, and therefore the feedability of the welding wire through the welding cable is liable to deteriorate. Further, even if the wire feed device is arranged below the third axis of the welding robot (i.e., by the side of the lower arm part) like in JP2010-36253A, flexure of the welding wire due to operation of the tilt axis can continue to occur. Further, even if a monitor device is used for calculating the feed resistance of the welding wire like in JP2001-293574A, the calculated amount of the feed resistance is affected by the weight of the welding wire which remains at a wire reel, and therefore it is not easy to accurately calculate the feed resistance of the welding wire. Furthermore, there is the defect that the monitor device of JP2001-293574A cannot calculate the feed resistance of the welding wire unless an actual welding process is performed.

A welding robot which can prevent deterioration of the feedability of the welding wire through the welding cable during operation of the arm is being sought.

SUMMARY OF INVENTION

According to a first aspect of the present invention, there is provided a welding robot comprising an arm which has a first link and a second link which are rotatably connected to each other, a welding torch which is attached to the arm at the first link side, a wire feed device which is attached to the arm at the second link side, a welding cable which is connected to both of the wire feed device and the welding torch for holding welding wire which is fed from the wire feed device to the welding torch, a control part which controls the operation of the arm so that the welding torch is moved over a predetermined welding path, and a monitoring part which monitors if the amount of flexure of the welding cable caused by operation of the rotational axis located between the first link and the second link while the welding torch is moved over the welding path under the control of the control part is within an allowable range.

According to a second aspect of the present invention, there is provided a welding robot according to the first aspect, wherein the monitoring part judges if at least one of an operating angle and an angular speed of the rotational axis is a predetermined upper limit value or less so as to monitor the amount of flexure of the welding cable.

According to a third aspect of the present invention, there is provided a welding robot according to the first or second aspect further comprising an alarm part which, if the amount of flexure of the welding cable exceeds an allowable range, outputs an alarm to the operator.

According to a fourth aspect of the present invention, there is provided a welding robot according to any of the first to third aspects wherein, the control part runs a robot program so as to control operation of the arm, and the robot further comprises a first notifying part which, if the amount of flexure of the welding cable exceeds an allowable range, notifies the operator of information showing the location of the robot program which the control part had been running at the point of time when the amount of flexure of the welding cable exceeded the allowable range.

According to a fifth aspect of the present invention, there is provided a welding robot according to any of the first to fourth aspects further comprising a second notifying part which, if the amount of flexure of the welding cable exceeds an allowable range, notifies the operator of the distance between the position of the welding torch at the point of time when the amount of flexure of the welding cable exceeded the allowable range and the starting point of the welding path.

According to a sixth aspect of the present invention, there is provided a welding robot comprising an arm which has a plurality of links which are connected in series, a welding torch which is attached to a front end link among the plurality of links, a wire feed device which is attached to a different link than the front end link among the plurality of links, a welding cable which is connected to both of the wire feed device and the welding torch for holding welding wire which is fed from the wire feed device to the welding torch, a control part which controls the operation of the arm so that the welding torch is moved over a predetermined welding path, and a monitoring part which monitors if the amount of flexure of the welding cable caused by operation of one or more rotational axes of the arm which are located between the front end link and other link while the welding torch is moved over the welding path under the control of the control part is within an allowable range.

According to a seventh aspect of the present invention, there is provided a welding robot according to the sixth aspect, wherein the monitoring part judges if the straight line distance between the base end part of the welding cable which is connected to the welding torch and the front end part of the welding cable which is connected to the wire feed device is a predetermined lower limit value or more so as to monitor the amount of flexure of the welding cable.

According to an eighth aspect of the present invention, there is provided a welding robot according to the sixth or seventh aspects further comprising an alarm part which, if the amount of flexure of the welding cable exceeds an allowable range, outputs an alarm to the operator.

According to a ninth aspect of the present invention, there is provided a welding robot according to any one of the sixth to eighth aspects, wherein the control part runs a robot program so as to control operation of the arm, and the robot further comprises a first notifying part which, if the amount of flexure of the welding cable exceeds an allowable range, notifies the operator of information showing the location of the robot program which the control part had been running at the point of time when the amount of flexure of the welding cable exceeded the allowable range.

According to a 10th aspect of the present invention, there is provided a welding robot according to any one of the sixth to ninth aspects further comprising a second notifying part which, if the amount of flexure of the welding cable exceeds an allowable range, notifies the operator of the distance between the position of the welding torch at the point of time when the amount of flexure of the welding cable exceeded the allowable range and the starting point of the welding path.

These and other objects, features, and advantages of the present invention will become clearer with reference to the detailed explanation of illustrative embodiments of the present invention shown in the appended drawings.

BRIEF DESCRIPTION OF THE DRAWINGS

FIG. 5 is a flow chart showing a routine of a test operation of a welding process by the robot control device in FIG. 3.

DETAILED DESCRIPTION OF EMBODIMENTS

Below, embodiments of the present invention will be explained in detail with reference to the drawings. In the figures, similar components are assigned similar reference notations. Note that, the following description does not limit the technical scope of the inventions described in the claims or the meanings of the terminology etc.

Figure 1:
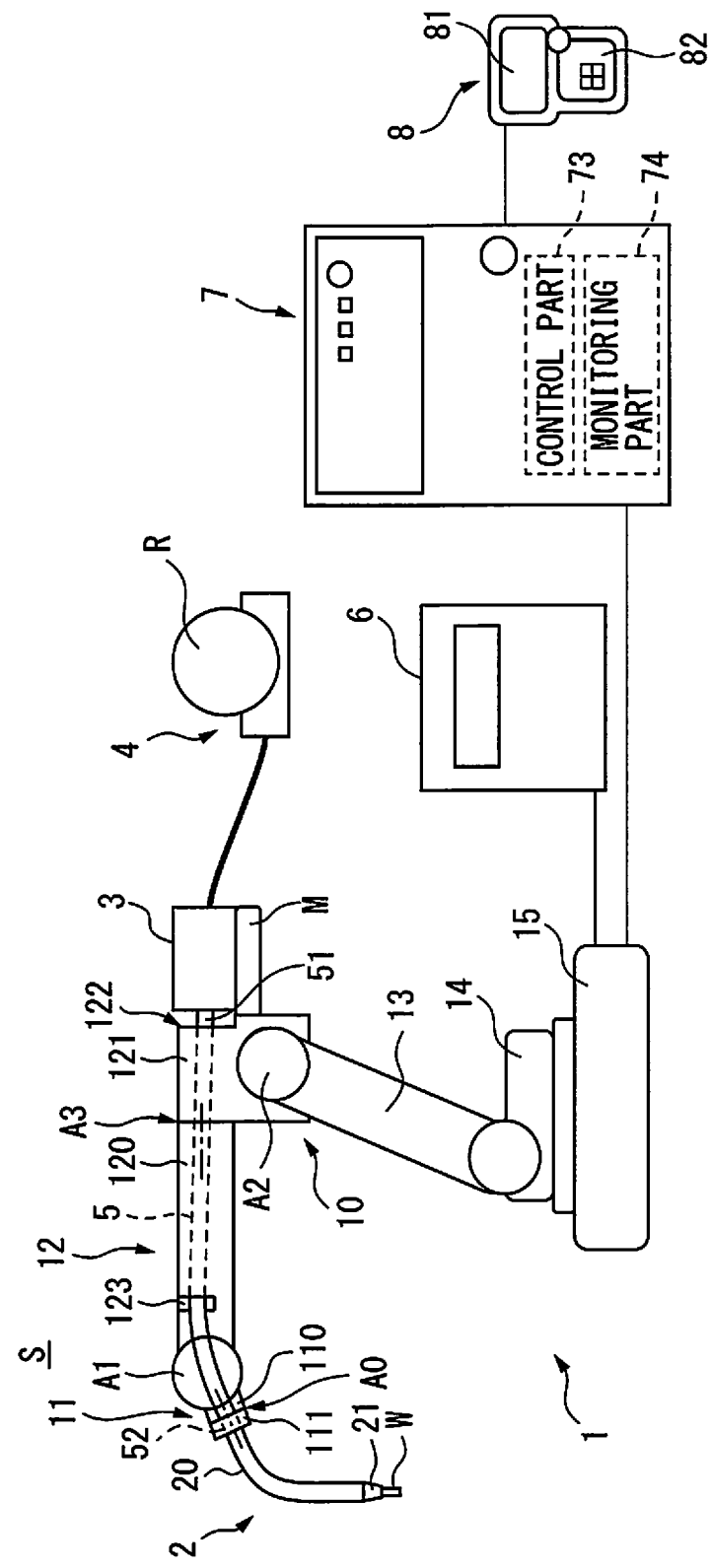
FIG. 1 is a schematic view of an illustrative welding system which includes a welding robot of a first embodiment of the present invention.

Referring to FIG. 1 to FIG. 5, a welding robot of a first embodiment of the present invention will be explained. FIG. 1 is a schematic view showing one example of a welding system which includes the welding robot of the present embodiment. The welding system S of the present example is an automation system capable of performing the process of moving the welding torch along a predetermined welding path for joining welding base materials. This process will be referred to below simply as the "welding process". As shown in FIG. 1, the welding system S includes a welding robot 1, a welding machine 6 which is connected to the welding robot 1, a robot control device 7 which is connected to the welding robot 1 and welding machine 6, a teaching panel 8 which is connected to the robot control device 7, etc. The above system will be explained in detail below.

First, the above welding robot 1 will be explained. As shown in FIG. 1, the welding robot 1 is a vertical multi-articulated robot which has an arm 10 comprising a plurality of links which are connected in series, and a plurality of rotational axes which rotatably support the adjoining links with respect to each other. More specifically, the welding robot 1 has a wrist part 11 which is located at the front end part of the arm 10, an upper arm part 12 which is connected to the base end part of the wrist part 11, and a lower arm part 13 which is connected to the base end part of the upper arm part 12. Further, the welding robot 1 has a first rotational axis A1 which rotatably supports the wrist part 11 and upper arm part 12, and a second rotational axis A2 which rotatably supports the upper arm part 12 and lower arm part 13. Below, the first rotational axis A1 will be referred to as a "wrist tilt axis A1", while the second rotational axis A2 will sometimes be referred to as an "upper arm tilt axis A2".

The above wrist part 11 is one example of the first link of the welding robot 1 of the present embodiment, while the above upper arm part 12 is one example of the second link of the welding robot 1 of the present embodiment. As shown in FIG. 1, the wrist part 11 has the later explained welding torch 2 attached to it, while the upper arm part 12 has the later explained wire feed device 3 attached to it. Note that, the base end part of the lower arm part 13 is rotatably attached to a swivel base part 14 which supports the arm 10 above it. The swivel base part 14 is attached to a fixed base part 15 which is swivelably attached to the floor surface. Further, the welding robot 1 has a plurality of servo motors (not shown) which drive a plurality of rotational axes including the wrist tilt axis A1 and the upper arm tilt axis A2. The welding robot 1 can freely change the position and posture of the welding torch 2 which is attached to the wrist part 11 by the drive forces of these servo motors. Due to this, the welding torch 2 can be positioned with respect to the welding base materials.

Next, the above-mentioned welding torch 2 will be explained. As shown in FIG. 1, the welding torch 2 has a curved tubular shaped torch body 20, and a contact tip 21 which is attached to the front end part of the torch body 20. The base end part of the torch body 20 is attached to the wrist part 11 of the welding robot 1. The contact tip 21 has a center hole which communicates with the inside space of the torch body 20. The wire-shaped filler metal passes through the center hole of the contact tip 21 and is exposed to the outside of the welding torch 2. Below, the wire-shaped filler metal will be called the "welding wire W". The contact tip 21 is electrically connected to a later explained welding machine 6. During the execution of the welding process, a large current flows from the welding machine 6 to the contact tip 21. As a result, a high temperature arc discharge is caused between the contact tip 21 and the welding base materials, and therefore the welding wire W is melt and bonded to the welding base materials. Due to this, the welding base materials are joined through melt bonded parts of the welding wire W.

Next, the above-mentioned welding wire W will be explained. The welding wire W is a consumable filler metal which is used for a welding process, and is supplied to the welding system in the form of a coil wound around a wire reel R. As shown in FIG. 1, the welding system S has a wire reel stand 4 which is arranged adjoining the welding robot 1. The wire reel stand 4 rotatably holds the above wire reel R. For this reason, if the feed operation of the later explained wire feed device 3 is performed, the welding wire W is unwound from the wire reel R and is fed out toward the welding torch 2.

Next, the above wire feed device 3 will be explained. The wire feed device 3 has at least one pair of guide rollers (not shown) and an electric motor or other drive device (not shown) for driving the guide rollers. The wire feed device 3 is configured so as to feed out the welding wire W sandwiched between the guide rollers toward the welding torch 2. As shown in FIG. 1, the wire feed device 3 is attached to the base end side of the upper arm part 12 through an attachment member M with a predetermined shape. In particular, the wire feed device 3 is fastened to the upper arm part 12 so that the feed direction of the welding wire W is parallel to the extension direction of the upper arm part 12. That is, even if the upper arm part 12 is changed in posture during the operation of the welding robot 1, the feed direction of the welding wire W is maintained constantly parallel to the extension direction of the upper arm part 12 (see also FIG. 4A and FIG. 4B).

The feed speed of the welding wire W by the wire feed device 3 may be a constant value or may be a variable value which changes in accordance with the operating speed of the welding robot 1. To secure a high weld quality, it is important to accurately control the feed speed of the welding wire W by the wire feed device 3. The welding wire W which is fed out from the wire feed device 3 passes through the inside of the later explained welding cable 5 and reaches the welding torch 2.

Next, the above welding cable 5 will be explained. The welding cable 5 is connected to both the wire feed device 3 and the welding torch 2 so as to store the welding wire W which is fed from the wire feed device 3 to the welding torch 2. More specifically, the welding cable 5 has a base end part 51 which is connected to the feed opening of the wire feed device 3 where welding wire W is fed out, and a front end part 52 which is connected to the base end part of the torch body 20. At the inside of the welding cable 5, a conduit cable (not shown) is inserted for guiding the welding wire W from the base end part 51 to the front end part 52. The welding wire W is inserted through the inside of the conduit cable.

Figure 2A:
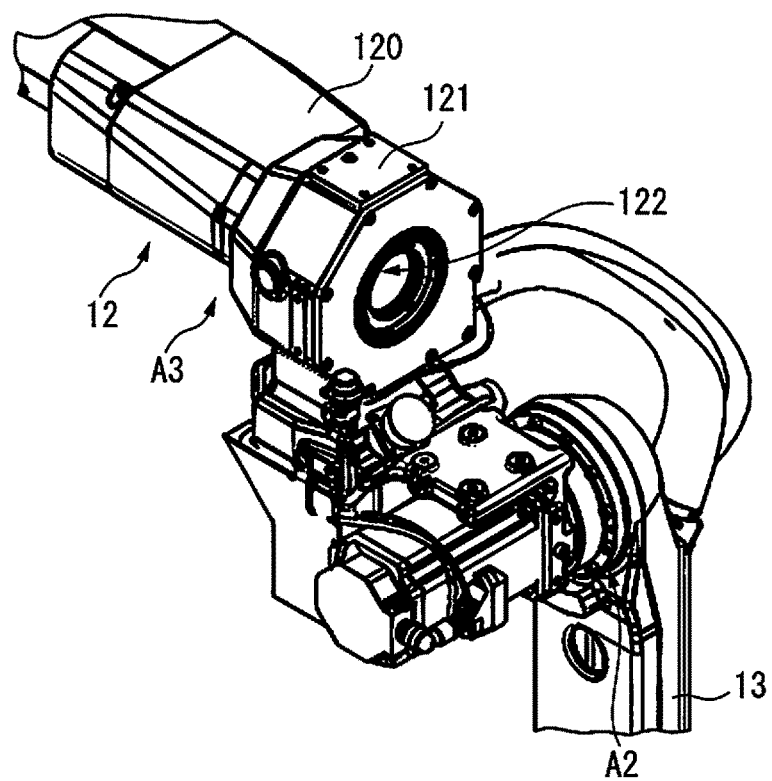
FIG. 2A is a perspective view showing enlarged a base end part of an upper arm part of the welding robot in FIG. 1.

Here, the arrangement of the welding cable 5 with respect to the arm 10 of the welding robot 1 will be explained. As shown in FIG. 1, in the welding robot 1 of the present example, the majority of the welding cable 5 is located at the inside of the upper arm part 12. FIG. 2A is an enlarged perspective view showing the upper arm tilt axis A2 and its vicinity in FIG. 1. For convenience, in FIG. 2A, the welding cable 5 and wire feed device 3 are omitted. As shown in FIG. 1 and FIG. 2A, the upper arm part 12 has an upper arm body part 120 which is located at the wrist tilt axis A1 side, and an upper arm base end part 121 which is located at the upper arm tilt axis A2 side. The upper arm body part 120 is rotatably coupled with the upper arm base end part 121 through the upper arm pivot axis A3 which has an axis parallel to the extension direction. In FIG. 1 and FIG. 2A, the axial line of the upper arm pivot axis A3 is indicated by a one-dot chain line. The upper arm body part 120 has a hollow tubular form. Further, the upper arm base end part 121 is provided with a base end opening 122 which communicates with the inside space of the upper arm body part 120. The welding cable 5 is inserted from the base end opening 122 to the inside of the upper arm body part 120. Further, as shown in FIG. 1, the upper arm body part 120 is provided with a side opening 123 which adjoins the wrist tilt axis A1. The welding cable 5 is led out from the side opening 123 to the outside of the upper arm body part 120. Further, the part of the welding cable 5 which is led out from the side opening 123, cuts across the wrist tilt axis A1 and reaches the wrist part 11.

Figure 2B:
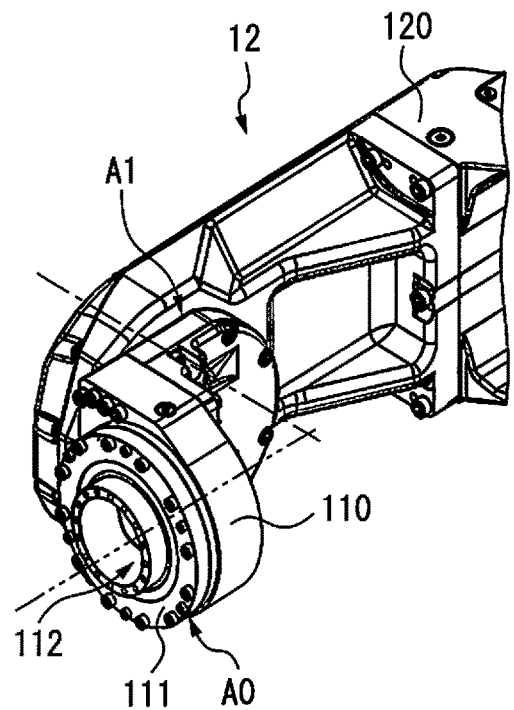
FIG. 2B is an enlarged perspective view showing a wrist part of the welding robot in FIG. 1.

FIG. 2B is an enlarged perspective view showing the wrist part 11 in FIG. 1. For convenience, in FIG. 2B, the welding cable 5 and welding torch 2 are omitted. As shown in FIG. 2B, the wrist part 11 has a wrist body part 110 which is connected to the upper arm part 12 through the wrist tilt axis A1 and a wrist front end part 111 which is connected to the wrist body part 110 through the wrist pivot axis A0 which has an axis perpendicularly intersecting the wrist tilt axis A1. The wrist front end part 111 has the base end part of the torch body 20 attached to it. Further, the wrist body part 110 and the wrist front end part 111 are provided with through holes 112 which extend along the axial line of the wrist pivot axis A0. In FIG. 2B, the axial line of the wrist tilt axis A1 is indicated by the one-dot chain line, while the axial line of the wrist pivot axis A0 is indicated by the two-dot chain line. In FIG. 1 as well, the axial line of the wrist pivot axis A0 is indicated by a two-dot chain line. The front end part 52 of the welding cable 5 is inserted into the above-mentioned through hole 112 from the base end side of the wrist part 11. Due to this, the front end part 52 of the welding cable 5 is fastened to the wrist part 11. Further, if the wrist front end part 111 has a torch body 20 attached to it, the through hole 112 communicates with the inside space of the torch body 20. Due to this, the front end part 52 of the welding cable 5 is connected to the base end part of the torch body 20.

As explained above, in the welding robot 1 of the present example, the welding cable 5 is constrained by both the first link (wrist part 11) and second link (upper arm part 12) of the arm 10. The "constrained" referred to here includes both the state where part of the welding cable 5 is supported with respect to the arm 10 in a fixed manner, and the state where part of the welding cable 5 is supported with respect to the arm 10 to be movable within a predetermined range. As shown in FIG. 1, in the welding robot 1 of the present example, the front end part 52 of the welding cable 5 is supported by the wrist part 11 in a fixed manner. Further, the part of the welding cable 5 inserted in the upper arm part 12, shown by the broken line in FIG. 1, is movably supported (in particular, slidably supported) by at least one of the side opening 123 of the upper arm body part 120, the inner surfaces of the upper arm body part 120 and upper arm base end part 121, and the inner surface of the base end opening 122 of the upper arm base end part 121.

Incidentally, the welding cable 5 is formed from a material which has a certain extent of flexibility. However, if the amount of flexure of the welding cable 5 is larger, the frictional force which acts between the inner surface of the conduit cable and the outer surface of the welding wire W is larger, and therefore the feedability of the welding wire W through the welding cable 5 deteriorates. The "feedability" of the welding wire W which is referred to here means how easily the welding wire W which is fed from the wire feed device 3 can pass through the welding cable 5. Deterioration of the feedability of the welding wire W causes a drop in the weld quality. For this reason, it is preferable that the amount of flexure of the welding cable 5 due to the operation of the welding robot 1 is kept from becoming excessively large during the welding process. The "amount of flexure" of the welding cable 5 which is referred to here includes not only the curvature of the welding cable 5, but also the amount of increase per unit time of the curvature of the welding cable 5. When the amount of increase per unit time of the curvature of the welding cable 5 is large, the frictional force between the conduit cable and the welding wire W rapidly changes, and therefore the feedability of the welding wire W can be unstable. The instability of the feedability of the welding wire W also causes deterioration of the weld quality.

Referring again to FIG. 1, the above welding machine 6 will be explained. The welding machine 6 is a power source device which feeds electric power for arc discharge to the contact tip 21 of the welding torch 2. Further, the welding machine 6 has the function of controlling the feed operation of the wire feed device 3. In particular, the welding machine 6 is capable of communicating with the welding robot 1, and is configured to perform control of powering the contact tip 21 and control of operation of the wire feed device 3 in accordance with the operation of the welding robot 1. Next, the above robot control device 7 will be explained. The robot control device 7 is a control device which controls the operation of the servo motors of the welding robot 1. Further, the robot control device 7 has the function of generating control commands for the welding machine 6, the function of monitoring operations of various parts of the welding robot 1, the function of outputting an alarm to the operator under predetermined conditions, etc. The system configuration of the robot control device 7 will be explained later with reference to FIG. 3.

Next, the above-mentioned teaching panel 8 will be explained. The teaching panel 8 is a teaching device which is used for the teaching operation of the welding robot 1, and has a display part 81 which displays information to the operator and an entry part 82 which receives a teaching operation from the operator. The teaching panel 8 has the function of preparing a program for the operation of the welding robot 1 in conjunction with the robot control device 7. More specifically, if the operator performs a teaching operation of the welding robot 1 using the teaching panel 8, the robot control device 7 prepares an operating program for playing back the operation of the welding robot 1 caused by the teaching operation. The thus prepared operating program is stored in a memory part of the later explained robot control device 7.

Figure 3:
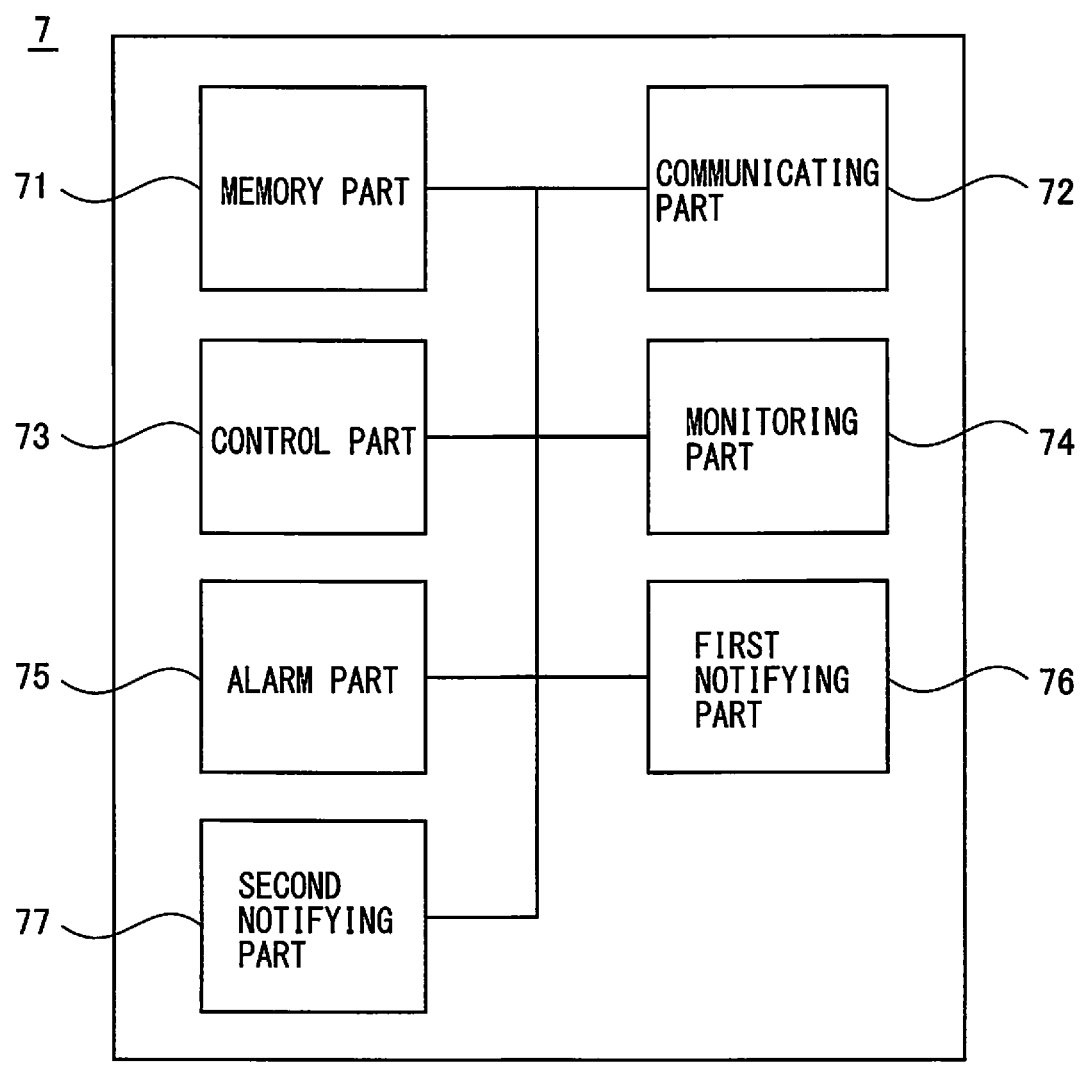
FIG. 3 is a block diagram showing a system configuration of the robot control device in FIG. 1.

Next, the system configuration of the robot control device 7 in FIG. 1 will be explained. FIG. 3 is a block diagram of the robot control device 7 in FIG. 1. As shown in FIG. 3, the robot control device 7 has a memory part 71, communicating part 72, control part 73, monitoring part 74, alarm part 75, first notifying part 76, and second notifying part 77. The components of the robot control device 7 will be explained in order below. First, the memory part 71 is a data storage region including a ROM, RAM, HDD, etc. The memory part 71 stores the operating program of the welding robot 1 and various data such as the control parameters of the welding robot 1 and welding machine 6. Next, the communicating part 72 is an input/output interface for communicating with external devices including the welding robot 1, the welding machine 6, and the teaching panel 8.

Next, the control part 73 has the function of running the operating program in the memory part 71 to generate control commands for the servo motors of the welding robot 1. Below, control commands to the servo motors of the welding robot 1 will be simply referred to as "servo control commands". The servo control commands are control commands for moving the welding torch 2 which is attached to the arm 10 along a predetermined welding path. The servo control commands are sent by the communicating part 72 to the welding robot 1. Further, the control part 73 has the function of generating control commands for the wire feed device 3 and the welding machine 6. Below, the control commands for the wire feed device 3 and the welding machine 6 will be simply referred to as "welding control commands". The welding control commands include control commands for feeding the welding wire W in accordance with the operation of the welding robot 1 and control commands for feeding electric power for arc discharge to the contact tip 21 in accordance with the operation of the welding robot 1. The welding control commands are sent by the communicating part 72 to the welding machine 6 and the wire feed device 3.

Next, the monitoring part 74 has the function of monitoring the amount of flexure of the welding cable 5 caused by the operation of the welding robot 1. More specifically, the monitoring part 74 is configured to monitor if the amount of flexure of the welding cable 5 caused by the operation of the welding robot 1 is within an allowable range. The "allowable range" of the amount of flexure referred to here means the range of the amount of flexure where the feedability of the welding wire W through the welding cable 5 does not greatly deteriorate. For example, the monitoring part 74 is configured so as to judge if the operating angle of the wrist tilt axis A1 of the welding robot 1 is a predetermined upper limit value or less. Further, when the operating angle of the wrist tilt axis A1 is the upper limit value or less, it is judged that the amount of flexure of the welding cable 5 is within the allowable range. When the operating angle of the wrist tilt axis A1 is larger than the upper limit value, it is judged that the amount of flexure of the welding cable 5 has exceeded the allowable range.

Figure 4A:
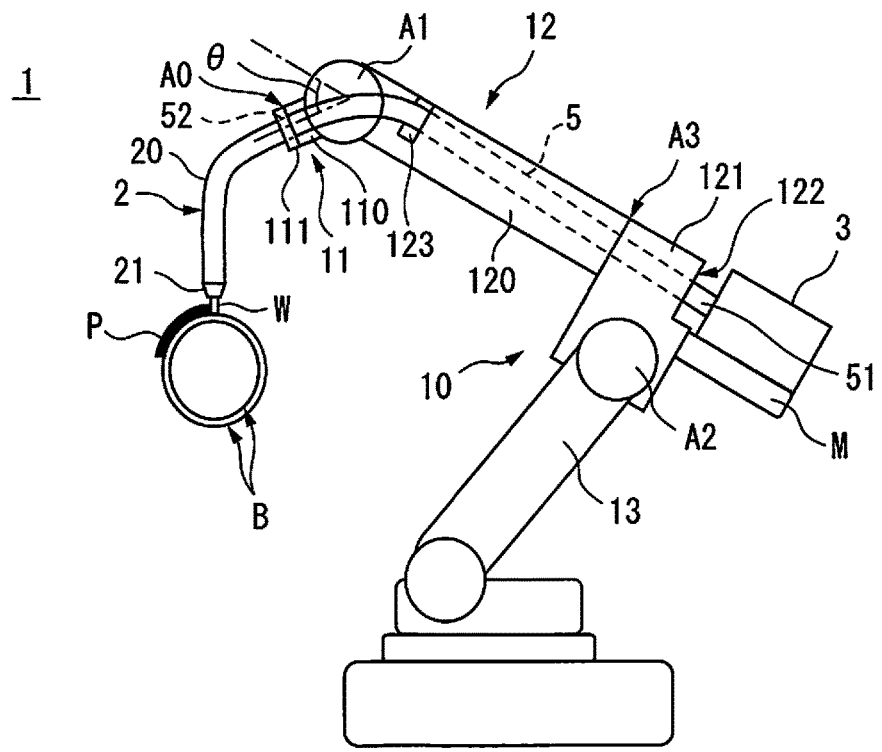
FIG. 4A is a first schematic view for explaining the method where the monitoring part in FIG. 3 monitors an amount of flexure of a welding cable.
Figure 4B:
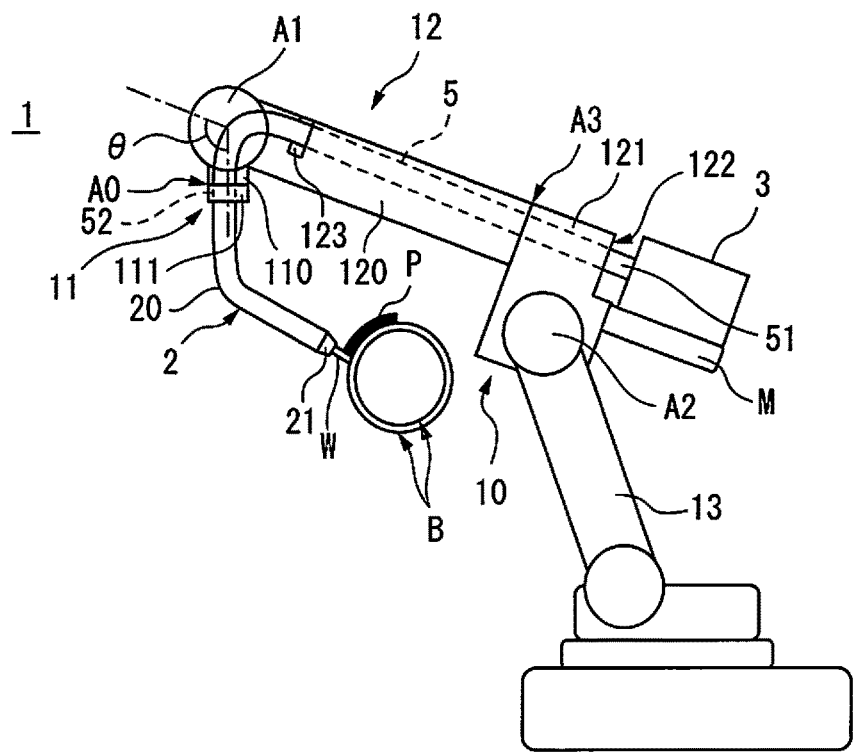
FIG. 4B is a second schematic view for explaining the method where the monitoring part in FIG. 3 monitors an amount of flexure of a welding cable.

FIG. 4A and FIG. 4B are schematic views for explaining the method where the monitoring part 74 in FIG. 3 monitors the amount of flexure of the welding cable 5. FIG. 4A and FIG. 4B show by time series the process of the welding robot 1 welding two tubular shaped welding base materials B. The two welding base materials B have the same dimensions in the diametrical direction and are laid horizontally so that their end faces adjoin each other. As shown in FIG. 4A and FIG. 4B, the welding path P where the front end part of the welding torch 2 travels during the welding process, extends in a curved shape over about ¼ of the outer circumferences of the tubular welding base materials B. Note that, the wrist pivot axis A0 and upper arm pivot axis A3 do not operate from the point of time of FIG. 4A to the point of time of FIG. 4B.

As explained above, in the welding robot 1 of the present example, the welding cable 5 is fastened to the wrist part 11 and is stored at the inside of the upper arm part 12. That is, the welding cable 5 is constrained by both of the wrist part 11 and the upper arm part 12 of the arm 10. Therefore, in the welding robot 1 of the present example, the operation of the wrist tilt axis A1 directly causes flexure of the welding cable 5, and therefore it is useful for the monitoring part 74 to monitor the operating angle θ of the wrist tilt axis A1. The operating angle θ of the wrist tilt axis A1 referred to here means the rotational angle from the rotational position of the wrist tilt axis A1 at the point of time when the wrist part 11 and the upper arm part 12 extend in a straight line to the current rotational position of the wrist tilt axis A1. That is, the operating angle θ of the wrist tilt axis A1 is zero when the wrist part 11 and the upper arm part 12 extend in a straight line, while the operating angle θ of the wrist tilt axis A1 is 90° when the wrist part 11 and the upper arm part 12 perpendicularly intersect.

At the point of time of FIG. 4A, the operating angle θ of the wrist tilt axis A1 falls greatly below 90°, and therefore the curvature of the welding cable 5 is not that large. For this reason, at the point of time of FIG. 4A, it is judged that the amount of flexure of the welding cable 5 is within the allowable range. On the other hand, at the point of time of FIG. 4B, the operating angle θ of the wrist tilt axis A1 greatly exceeds 90°, and therefore the curvature of the welding cable 5 is excessively large. For this reason, at the point of time of FIG. 4B, it is judged that the amount of flexure of the welding cable 5 has exceeded the allowable range. In this way, the monitoring part 74 of the present example judges if the operating angle θ of the wrist tilt axis A1 is the predetermined upper limit value (for example 90°) or less so as to monitor the state of flexure the welding cable 5. The monitoring part 74 of the present example acquires information on the rotational position of the wrist tilt axis A1 from an encoder (not shown) which is built in a servo motor of the welding robot 1 and calculate the operating angle of the wrist tilt axis A1 based on the information on the rotational position.

Incidentally, the feedability of the welding wire W which travels through the welding cable 5 may deteriorate when the angular speed of the wrist tilt axis A1 is large, in the same way as when the operating angle of the wrist tilt axis A1 is large. The reason is that when the angular speed of the wrist tilt axis A1 is large, the curvature of the welding cable 5 rapidly increases, and therefore the frictional force between the conduit cable and the welding wire W also rapidly increases. As a result, a discrepancy arises between the feed speed commanded to the wire feed device 3 and the actual feed speed, and therefore the weld quality is liable to temporarily fall. For this reason, the monitoring part 74 of the present example is configured so as to monitor the angular speed of the wrist tilt part A1, in addition to the above operating angle θ or instead of the above operating angle θ.

More specifically, the monitoring part 74 of the present example judges if the angular speed of the wrist tilt axis A1 is the predetermined upper limit value (for example, 90 deg/sec) or less to monitor the amount of flexure of the welding cable 5. Further, when the angular speed of the wrist tilt axis A1 is the upper limit value or less, it is judged that the amount of flexure of the welding cable 5 is within an allowable range. When the angular speed of the wrist tilt axis A1 is larger than the upper limit value, it is judged that the amount of flexure of the welding cable 5 has exceeded the allowable range. The monitoring part 74 of the present example acquires information on the rotational position of the wrist tilt axis A1 from an encoder (not shown) which is built in a servo motor of the welding robot 1 and calculates the angular speed of the wrist tilt axis A1 based on the information on the rotational position.

In the above way, the monitoring part 74 of the present example judges whether at least one of the operating angle and the angular speed of the wrist tilt axis A1 is the corresponding upper limit value or less to monitor the amount of flexure of the welding cable 5. Further, it is judged that the amount of flexure of the welding cable is within an allowable range when at least one of the operating angle and the angular speed of the wrist tilt axis A1 is a corresponding upper limit value or less. On the other hand, it is judged that the amount of flexure of the welding cable 5 exceeds the allowable range when at least one of the operating angle and the angular speed of the wrist tilt axis A1 exceeds the corresponding upper limit value. That is, not only when both of the operating angle and the angular speed of the wrist tilt axis A1 exceed the upper limit value, but also when only one of the operating angle and the angular speed exceeds the upper limit value, it is judged that the amount of flexure of the welding cable 5 has exceeded the allowable range. The results of monitoring by the monitoring part 74 are sent to the alarm part 75, first notifying part 76, and second notifying part 77.

Referring again to FIG. 3, the alarm part 75 of the robot control device 7 has the function of outputting an alarm to the operator in accordance with the results of monitoring of the monitoring part 74. More specifically, the alarm part 75 can output an alarm for notifying the operator of the deterioration of the feedability of the welding wire W when the amount of flexure of the welding cable 5 exceeds an allowable range. Such an alarm is an audio alarm or a string of words. The audio alarm is, for example, output from a sound output part (not shown) which is equipped in the robot control device 7 or the teaching panel 8. The alarm of a string of words is displayed, for example, on a display part 81 of the teaching panel 8.

Next, the first notifying part 76 of the robot control device 7 has the function of notifying the operator of predetermined information in accordance with the results of monitoring of the monitoring part 74. More specifically, the first notifying part 76 is configured to notify the operator of the location of the operating program (for example, the row number of the operating program) which the control part 73 was running at the point of time when the amount of flexure of the welding cable 5 exceeds an allowable range. Such information is displayed at, for example, the display part 81 of the teaching panel 8. Due to this, the operator can identify the location of the operating program which caused deterioration of the feedability of the welding wire W. Therefore, the operator can easily obtain a grasp of how to correct the teaching operation of the welding robot 1 for preventing deterioration of the feedability of the welding wire W.

Next, the second notifying part 77 of the robot control device, like the first notifying part 76, has the function of notifying predetermined information to the operator in accordance with the results of monitoring of the monitoring part 74. More specifically, the second notifying part 77 is configured to notify the operator of the distance between the position of the welding torch 2 at that point of time and the starting point of the welding path P if the amount of flexure of the welding cable 5 exceeds the allowable range. This information is, for example, displayed at the display part 81 of the teaching panel 8. Due to this, the operator can identify the position of the welding path P where the feedability of the welding wire W deteriorates. Therefore, the operator can easily obtain a grasp of how to correct the teaching operation of the welding robot 1 for preventing deterioration of the feedability of the welding wire W.

The robot control device 7 with the above configuration has the function of operating both the welding robot 1 and the welding machine 6 and executing the welding process, and also the function of operating only the welding robot 1 and performing a test operation of the welding process. The test operation of such a welding process will be explained in detail below. FIG. 5 is a flow chart showing the routine of a test operation of the welding process by the robot control device 7 in FIG. 3. First, at step S501, the control part 73 starts to run an operating program in the memory part 71. At this step, the control part 73 generates only servo control commands for the welding robot 1 and does not generate welding control commands for the wire feed device 3 and welding machine 6. Next, at step S502, the control part 73 judges if the welding torch 2 has entered a predetermined welding path P. If the welding torch 2 has still not entered the welding path P (step S502, NO), the control part 73 continues to run the operating program (step S503).

On the other hand, once the welding torch 2 enters the welding path P (step S502, YES), the monitoring part 74 starts monitoring the operating angle and the angular speed of the wrist tilt axis A1 (step S504). After that, the monitoring part 74 continues to monitor if both the operating angle and the angular speed of the wrist tilt axis A1 are the corresponding upper limit values or less (step S505). So long as both the operating angle and the angular speed of the wrist tilt axis A1 are the corresponding upper limit values or less (step S505, YES), the control part 73 continues to execute the operating program (step S506). If at least one of the operating angle and the angular speed of the wrist tilt axis A1 exceeds the corresponding upper limit value (step S505, NO), the alarm part 75 outputs an alarm notifying the operator that the feedability of the welding wire W has deteriorated (step S508). The alarm output by the alarm part 75 is an audio alarm output by a sound output part of the robot control device 7 or the teaching panel 8 or is a string of words displayed on a display part 81 of the teaching panel 8.

At step S508, furthermore, the first notifying part 76 notifies the operator of the row number of the operating program which the control part 73 was running at the point of time when at least one of the operating angle and the angular speed of the wrist tilt axis A1 exceeded the upper limit value. Information notified by the first notifying part 76 is a string of words displayed on the display part 81 of the teaching panel 8. At step S508, furthermore, the second notifying part 77 notifies the operator of the distance between the position of the welding torch 2 at the point of time when at least one of the operating angle and the angular speed of the wrist tilt axis A1 exceeded the upper limit value and the starting point of the welding path P. The information notified by the second notifying part 77 is a string of words displayed on a display part 81 of the teaching panel 8.

At step S507 following the above step S506, the control part 73 judges if the welding torch 2 has finished passing through the welding path P. If the welding torch 2 has not finished passing through the welding path P (step S507, NO), the robot control device 7 returns to the above step S505. If the welding torch 2 finishes passing through the welding path P (step S507, YES), the monitoring part 74 finishes monitoring the operating angle and the angular speed of the wrist tilt axis A1 (step S509). After that, the robot control device 7 ends the test operation of the welding process.

As explained above, the welding robot 1 of the present embodiment confirms if the feedability of the welding wire through the welding cable has deteriorated during operation of the arm, based on the results of monitoring whether the amount of flexure of the welding cable W is within a predetermined allowable range. Therefore, according to the welding robot 1 of the present embodiment, it is possible to prevent degradation of weld quality caused by deterioration of the feedability of the welding wire W. In particular, in the welding robot 1 of the present embodiment, the monitoring part 74 monitors the amount of flexure of the welding cable 5 based on at least one of the operating angle and the angular speed of the rotational axis (wrist tilt axis A1). Therefore, according to the welding robot 1 of the present embodiment, it is possible to easily confirm if the feedability of the welding wire W through the welding cable 5 has deteriorated during operation of the arm 10.

Incidentally, in a welding robot 1 of the type where the welding cable 5 is constrained by both of the first link (wrist part 11) and the second link (upper arm part 12) of the arm 10, the operation of the rotational axis (wrist tilt axis A1) directly causes flexure of the welding cable 5. Therefore, if the monitoring part 74 monitors the amount of flexure of the welding cable 5 based on the operating angle of the axis, it is possible to accurately judge if the feedability of the welding wire W has deteriorated during operation of the arm 10. In the above type of welding robot 1, the feedability of the welding wire W can be unstable due to rapid operation of the rotational axis. Therefore, if the monitoring part 74 monitors the amount of flexure of the welding cable 5 based on the angular speed of the rotational axis, it is possible to prevent degradation of the weld quality caused by instability of the feedability of the welding wire W. Furthermore, in the welding robot 1 of the present embodiment, the monitoring part 74 monitors the amount of flexure of the welding cable 5 based on the operation of the rotational axis, and therefore it is possible to confirm if the feedability of the welding wire W has deteriorated in the test operation of the welding process where welding is not actually performed.

Figure 6:
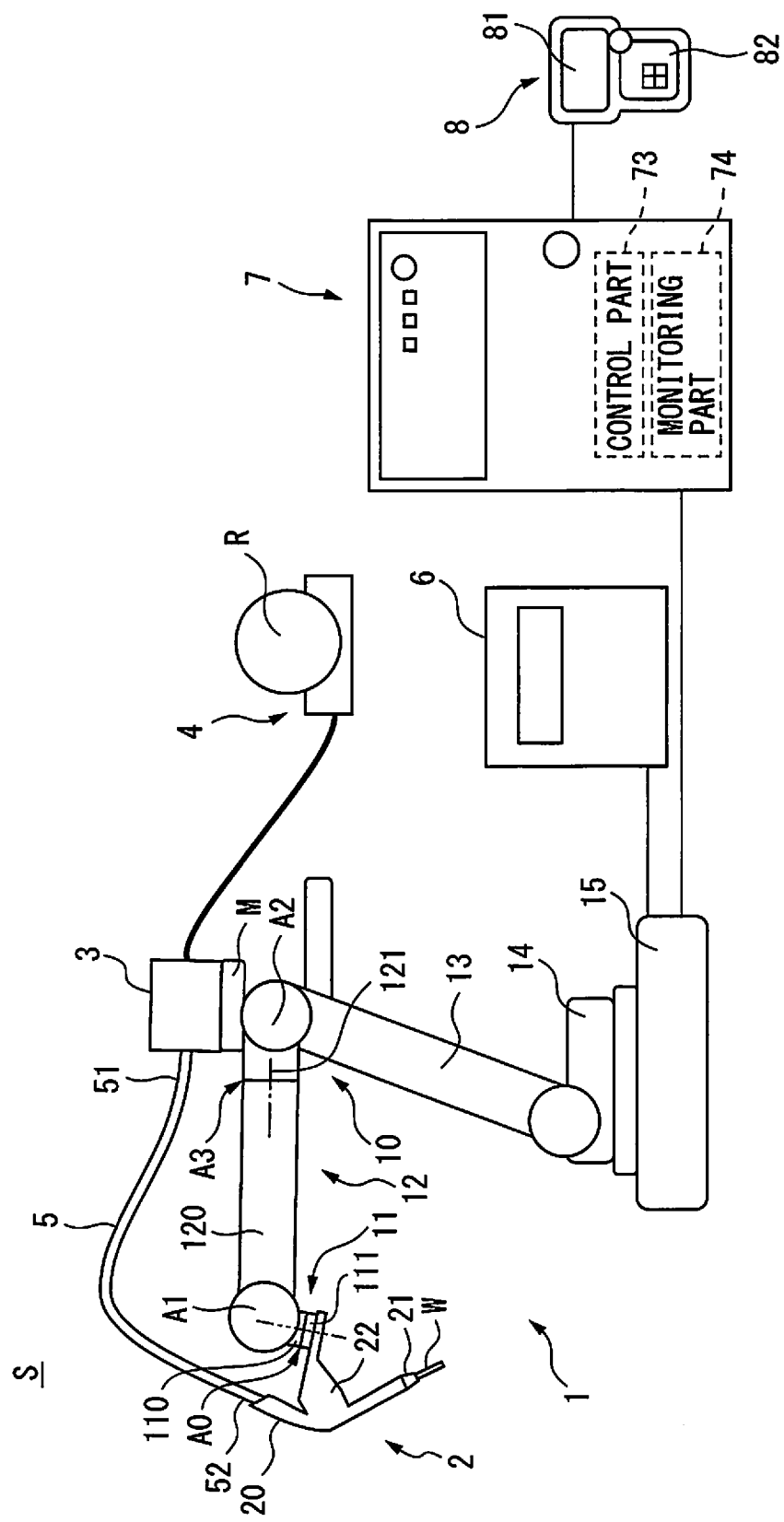
FIG. 6 is a schematic view of an illustrative welding system including a welding robot of a second embodiment of the present invention.

Next, referring to FIG. 6 to FIG. 8, a welding robot of a second embodiment of the present invention will be explained. FIG. 6 is a schematic view showing one example of a welding system S including the welding robot of the present embodiment. In the same way as the above-mentioned first embodiment, the welding robot 1 of the second embodiment has a wrist part 11 to which a welding torch 2 is attached, an upper arm part 12 which is connected to the wrist part 11 through a wrist tilt axis A1, and a lower arm part 13 which is connected to the upper arm part 12 through an upper arm tilt axis A2.

As shown in FIG. 6, the wrist part 11 has a wrist body part 110 and wrist front end part 111 which are rotatably connected through the wrist pivot axis A0. The upper arm part 12 has a upper arm body part 120 and upper arm base end part 121 which are rotatably connected through the upper arm pivot axis A3. In FIG. 6, the axial line of the wrist pivot axis A0 is shown by the two-dot chain line, while the axial line of the upper arm pivot axis A3 is shown by the one-dot chain line. As shown in FIG. 6, the welding torch 2 is attached to the wrist front end part 111, while the wire feed device 3 is attached to the upper arm base end part 121. In the welding robot 1 of the present embodiment, the wrist front end part 111 is one example of a front end link of the arm 10 to which the welding torch 2 is attached, while the upper arm base end part 121 is one example of a different link of the arm 10 to which the wire feed device 3 is attached.

As will be understood from a comparison between FIG. 1 and FIG. 6, the welding robot 1 of the second embodiment differs from the first embodiment in the structure of the welding torch 2 and arrangement of the welding cable 5 with respect to the arm 10. Below, the parts different from the first embodiment will be explained in detail. As shown in FIG. 6, the welding torch 2 of the present example has, in addition to the torch body 20 and the contact tip 21, an attachment member 22 with a predetermined shape. The attachment member 22 fastens the torch body 20 to the wrist front end part 111 of the arm 10. That is, in the welding robot 1 of the present example, the torch body 20 is attached to the wrist front end part 111 through an attachment member 22. Therefore, the connecting part of the welding cable 5, that is, the base end part of the torch body 20, is spaced from the wrist part 11. Further, in the welding robot 1 of the present example, as shown in FIG. 1, no part of the welding cable 5 is inserted inside the upper arm part 12. In other words, the entirety of the welding cable 5 is located at the outside of the upper arm part 12.

Figure 7A:
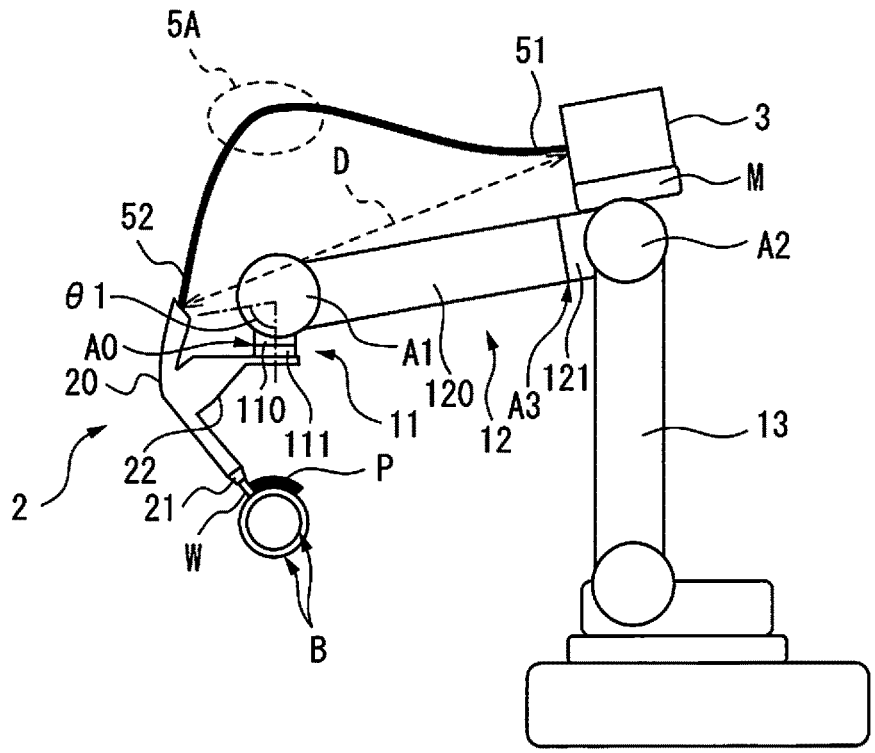
FIG. 7A is a first schematic view for explaining the method where the monitoring part in FIG. 6 monitors an amount of flexure of a welding cable.
Figure 7B:
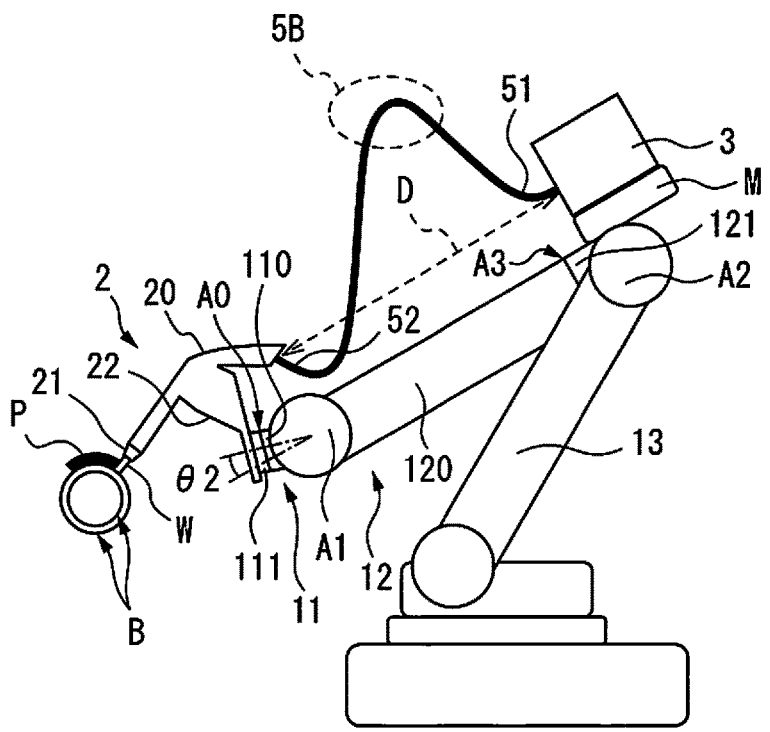
FIG. 7B is a second schematic view for explaining the method where the monitoring part in FIG. 6 monitors an amount of flexure of a welding cable.

In this way, in the welding robot 1 of the present example, the welding cable 5 is not constrained by either the first link (wrist part 11) or the second link (upper arm part 12) of the arm 10. According to the welding robot 1 with the above configuration, even if a monitoring part monitors the operation of the wrist tilt axis A1, it is not necessarily possible to accurately confirm the flexure state of the welding cable 5. For this reason, in the welding system S of the present example, the monitoring part 74 of the robot control device 7 monitors the amount of flexure of the welding cable by a method different from the first embodiment. FIG. 7A and FIG. 7B are schematic views for explaining the method where the monitoring part 74 in FIG. 6 monitors the amount of flexure of the welding cable 5. FIG. 7A and FIG. 7B, in the same way as in FIG. 4A and FIG. 4B, show by time series the process of the welding robot 1 welding two tubular shaped welding base materials B. During the welding process, the welding path P where the front end part of the welding torch 2 travels, in the same way as the example of FIG. 4A and FIG. 4B, extends in a curved shape over about ¼ of the outer circumferences of the tubular shaped welding base materials B.

As explained above, in the welding robot 1 of the present example, no part of the welding cable 5 is constrained by the wrist part 11 and upper arm part 12 of the arm 10. For this reason, in the welding robot 1 of the present example, the amount of flexure of the welding cable 5 is not necessarily larger just because the operating angle of the wrist tilt axis A1 is larger. In fact, the operating angle θ of the wrist tilt axis A1 1 at the point of time of FIG. 7A is larger than the operating angle θ2 at the point of time of FIG. 7B (θ1>θ2), but the maximum curvature of the welding cable 5 at the point of time of FIG. 7A is smaller than the maximum curvature at the point of time of FIG. 7B. The parts of the welding cable 5 which have the maximum curvature are shown in FIG. 7A and FIG. 7B by the reference notations 5A and 5B. On the other hand, a comparison between FIG. 7A and FIG. 7B reveals that as the straight line distance D between the base end part 51 and the front end part 52 of the welding cable 5 is smaller, the maximum curvature of the welding cable 5 tends to be larger.

Considering this point, the monitoring part 74 of the present example is configured to judge if the straight line distance D between the base end part 51 and the front end part 52 of the welding cable 5 is a predetermined lower limit value or more. In the following explanation, the maximum value of the straight line distance D which can be taken by the welding cable 5 while the wrist tilt axis A1 is rotated within its movable range will be referred to as the "maximum distance D0". At the point of time of FIG. 7A, the straight line distance D is substantially equal to the maximum distance D0, and therefore the maximum curvature of the welding cable 5 is not that large (see part represented by reference notation 5A). For this reason, at the point of time of FIG. 7A, it is judged that the amount of flexure of the welding cable 5 is within the allowable range.

On the other hand, at the point of time of FIG. 7B, the straight line distance D is less than 75% of the maximum distance D0, and therefore the maximum curvature of the welding cable 5 is excessively large (see part represented by reference notation 5B). For this reason, at the point of time of FIG. 7B, it is judged if the amount of flexure of the welding cable 5 has exceeded an allowable range. The monitoring part 74 of the present example acquires the information on the rotational positions of the wrist pivot axis A0, wrist tilt axis A1, and upper arm pivot axis A3 from encoders (not shown) which are built in the servo motors of the welding robot 1 and calculates the straight line distance D based on the information on the rotational positions of the rotational axes.

In the above way, in the present embodiment, the amount of flexure of the welding cable 5 is monitored based on the straight line distance D between the base end part 51 and the front end part 52 of the welding cable 5, instead of the operation of the wrist tilt axis A1. Therefore, according to the present embodiment, it is possible to monitor not only the amount of flexure caused by the operation of the wrist tilt axis A1, but also the amount of flexure of the cable caused by the operations of other rotational axes which are located between the link to which the front end part 52 of the welding cable 5 is attached and the link to which the base end part 51 is attached. In the present example, the link to which the front end part 52 of the welding cable 5 is attached is the wrist front end part 111, while the link to which the base end part 51 is attached is the upper arm base end part 121. As shown in FIG. 7A and FIG. 7B, the wrist pivot axis A0, wrist tilt axis A1, and upper arm pivot axis A3 are located between the wrist front end part 111 and the upper arm base end part 121. That is, according to the present embodiment, it is possible to monitor the amount of flexure of the welding cable 5 caused by the operations of the wrist pivot axis A0, wrist tilt axis A1, and upper arm pivot axis A3. Furthermore, according to the present embodiment, it is also possible to monitor the amount of flexure of the welding cable 5 caused by combined operations of the above three rotational axis A0, A1, and A3.

The robot control device 7 in FIG. 6, like the robot control device 7 in FIG. 1, has the function of operating only the welding robot 1 to perform a test operation of the welding process. The test operation of the welding process by the robot control device in FIG. 6 will be explained in detail below. FIG. 8 is a flow chart showing the routine of the test operation of the welding process by the robot control device 7 in FIG. 6. The flow chart of FIG. 8 is similar to the flow chart of the above FIG. 5 except for some of the steps. Below, the steps different from the flow chart of FIG. 4 will be explained in detail.

Figure 8:
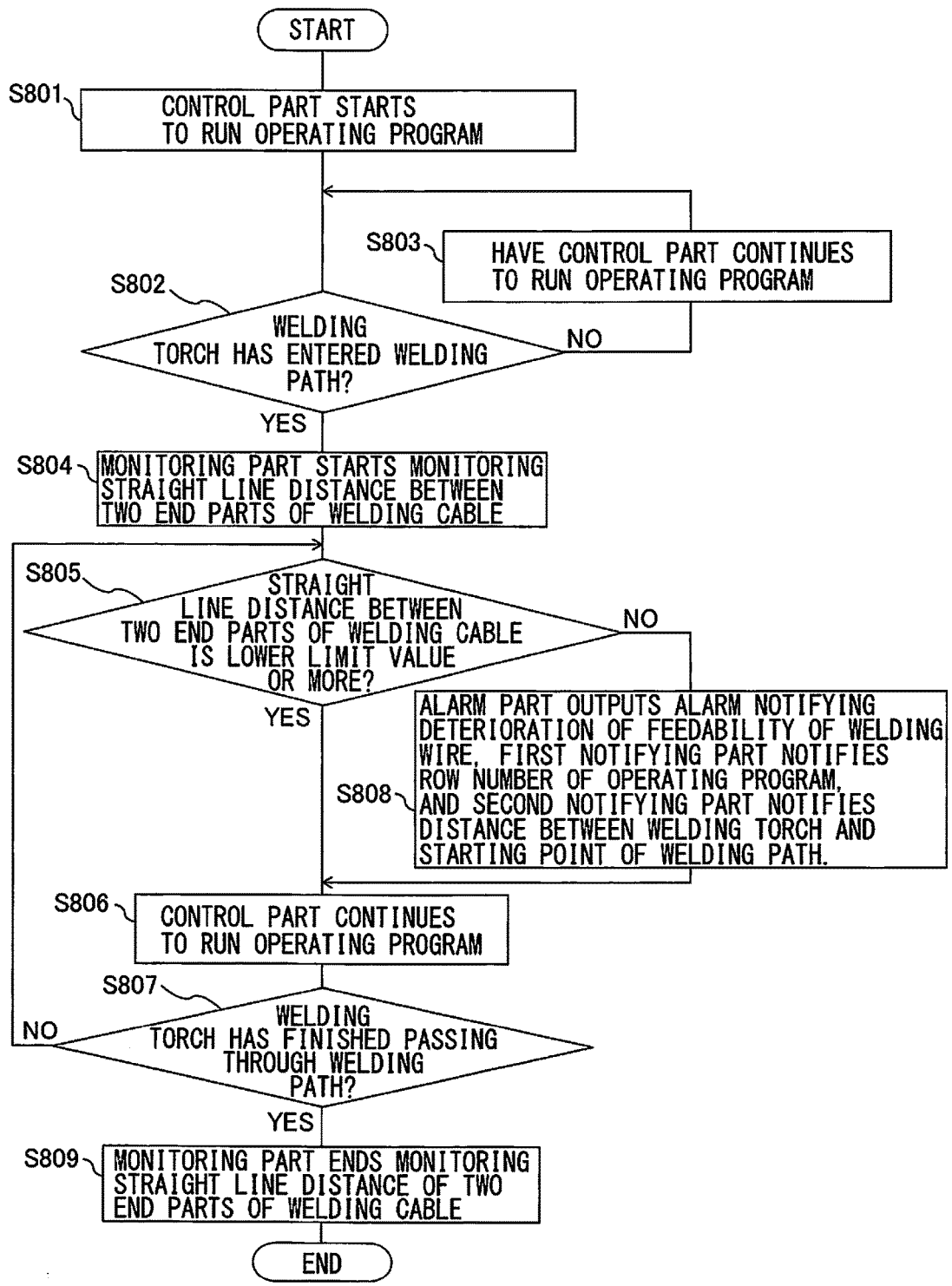
FIG. 8 is a flow chart showing a routine of a test operation of a welding process by the robot control device in FIG. 6.

As shown in FIG. 8, at step S804, the monitoring part 74 starts monitoring the straight line distance D between the two end parts of the welding cable 5. At step S809, the monitoring part 74 ends the monitoring of the straight line distance D between the two end parts of the welding cable 5. Between step S804 and step S809, the monitoring part 74 continues to monitor if the straight line distance D of the two end parts of the welding cable 5 is the lower limit value (for example, 75% of the maximum distance D0) or more (step S805). So long as the straight line distance D is the lower limit value or more (step S805, YES), the control part 73 continues to run the operating program (step S806). If the straight line distance D falls below the lower limit value (step S805, NO), the alarm part 75 outputs an alarm notifying the operator of the deterioration of the feedability of the welding wire (step S808). At step S808, furthermore, the first notifying part 76 notifies the operator of the row number of the operating program which the control part 73 was running when the straight line distance D fell below the lower limit value. At step S808, furthermore, the second notifying part 77 notifies the operator of the distance between the position of the welding torch 2 at the point of time when the straight line distance D fell below the lower limit value and the starting point of the welding path P.

As explained above, the welding robot 1 of the present embodiment confirms if the feedability of the welding wire through the welding cable deteriorates during operation of the arm based on the results of monitoring of whether the amount of flexure of the welding cable W is within the predetermined allowable range. Therefore, according to the welding robot 1 of the present embodiment, it is possible to prevent degradation of the weld quality caused by deterioration of the feedability of the welding wire W. In particular, in the welding robot 1 of the present embodiment, the monitoring part 74 of the robot control device 7 monitors the amount of flexure of the welding cable 5 based on the straight line distance D between the base end part 51 and the front end part 52 of the welding cable 5. Therefore, according to the welding robot 1 of the present embodiment, it is possible to easily confirm if the feedability of the welding wire W through the welding cable 5 deteriorates during operation of the arm 10.

In this regard, in a type of welding robot 1 where the welding cable 5 is not constrained by the arm 10 and is located at the outside of the arm 10, the maximum curvature of the welding cable 5 tends to increase as the straight line distance D between the base end part 51 and the front end part 52 of the welding cable 5 decreases. Therefore, according to the welding robot 1 of the present embodiment, even if the welding robot 1 has the above form, it is possible to accurately judge if the feedability of the welding wire has deteriorates during operation of the arm. Furthermore, in the welding robot 1 of the present embodiment, the monitoring part 74 monitors the amount of flexure of the welding cable 5 based on the above straight line distance D, and therefore even in a test operation of the welding process where welding is not actually performed, it is possible to confirm if the feedability of the welding wire W will deteriorate.

EFFECT OF INVENTION

According to the first and sixth aspects of the present invention, it is possible to confirm whether the feedability of the welding wire through the welding cable deteriorates during operation of the arm based on the results of monitoring as to whether the amount of flexure of the welding cable is within a predetermined allowable range. Therefore, according to the first and sixth aspects, it is possible to prevent degradation of the weld quality caused by deterioration of the feedability of the welding wire.

According to the second aspect of the present invention, the monitoring part monitor the amount of flexure of the welding cable based on at least one of the operating angle and the angular speed of a rotational axis, and therefore it is possible to easily confirm if the feedability of the welding wire through the welding cable deteriorates during operation of the arm. In particular, in a type of welding robot where the welding cable is constrained by both of the first link and second link, operation of a rotational axis can directly causes flexure of the welding cable. Therefore, if the monitoring part monitors the amount of flexure of the welding cable based on the operating angle of a rotational axis, it is possible to accurately judge if the feedability of the welding wire deteriorates during operation of the arm. Further, in the above type of welding robot, rapid operation of a rotational axis can cause instability of the feedability of the welding wire. Therefore, if the monitoring part monitors the amount of flexurer of the welding cable based on the angular speed of a rotational axis, it is possible to prevent degradation of the weld quality caused by instability of the feedability of the welding wire. Furthermore, according to the second aspect, the monitoring part monitors the amount of flexure of the welding cable based on the operation of a rotational axis, it is possible to confirm if the feedability of the welding wire deteriorates even in a test operation of the welding process where actual welding is not performed.

According to the seventh aspect of the present invention, the monitoring part monitors the amount of flexure of the welding cable based on the straight line distance between the base end part and front end part of the welding cable, and therefore it is possible to easily confirm whether the feedability of the welding wire through the welding cable deteriorates during operation of the arm. In particular, in a type of welding robot where the welding cable is not constrained by the arm and is located at the outside of the arm, the maximum curvature of the welding cable tends to increase as the straight line distance between the base end part and the front end part of the welding cable decreases. Therefore, according to the seventh aspect, even if the welding robot is of the above type, it is possible to accurately judge if the feedability of the welding wire deteriorated during operation of the arm. Furthermore, according to the seventh aspect, the monitoring part monitors the amount of flexure of the welding cable based on the above straight line distance, and therefore, even during a test operation of the welding process where welding is not actually performed, it is possible to confirm if the feedability of the welding wire deteriorates.

According to the third and eighth aspects of the present invention, when the amount of flexure of the welding cable exceeds the allowable range, it is possible to notify the operator that the weld quality is likely to drop due to this fact.

According to the fourth and ninth aspects of the present invention, when the amount of flexure of the welding cable exceeds the allowable range, it is possible to notify the operator of the location of the robot program which causes this event. As a result, the operator can easily grasp how to correct the teaching operation of the welding robot so as to prevent deterioration of the feedability of the welding wire.

According to the fifth and 10th aspects of the present invention, when the amount of flexure of the welding cable exceeds the allowable range, it is possible to notify the operator of the position on the weld path where the welding torch is travelling at that point of time. As a result, the operator can easily obtain a grasp of how to correct the teaching operation of the welding robot so as to prevent deterioration of the feedability of the welding wire.

The present invention is not limited to just the above embodiments and can be modified in various ways within the scope described in the claims. In particular, in the above embodiments, as the first link and second link of the welding robot 1, the wrist part 11 and upper arm part 12 were respectively illustrated, but the first link and second link of the welding robot 1 may also be other links which are rotatably connected to each other. For example, as the first link and second link of the welding robot 1, the above upper arm part 12 and lower arm part 13 may be respectively employed. Further, in the above embodiments, the welding robot 1 performs arc welding, but the welding method employed by the welding robot 1 may also be another welding method which uses a wire-shaped filler metal. For example, the welding method employed by the welding robot 1 may also be laser welding. Further, the arrangement of the welding cable 5 with respect to the arm of the welding robot 1 is not limited to just the arrangement which is illustrated in the above embodiments. Furthermore, the structures and functions of the devices of the above-mentioned welding system S are just examples. Structures and functions of types for achieving the effects of the present invention can be employed.

The invention claimed is:

1. A welding robot, comprising:
   an arm having a first link, and a second link rotatably connected to a base end part of the first link via a rotational axis:
   a welding torch attached to the arm at a side of the first link;
   a wire feed device attached to the arm at a side of the second link;
   a welding cable connected to both of the wire feed device and the welding torch and configured to hold a welding wire fed from the wire feed device to the welding torch, the welding cable being constrained by a first constraining part provided at the first link and a second constraining part provided at the second link to be adjacent to the rotational axis;
   a control part configured to control operation of the arm to move the welding torch over a predetermined welding path; and
   a monitoring part configured to judge that an amount of flexure of the welding cable caused by operation of the rotational axis is within an allowable range of the amount of flexure, when at least one of an operating angle and an angular speed of the rotational axis obtained during movement of the welding torch over the welding path under the control of the control part is equal to or less than a predetermined upper limit value corresponding to the allowable range, and
   judge that the amount of flexure exceeds the allowable range when the at least one of the operating angle and the angular speed is larger than the predetermined upper limit value.

2. The welding robot according to claim 1, further comprising: an alarm part configured to output an alarm to an operator when the monitoring part judges that the amount of flexure exceeds the allowable range.

3. The welding robot according to claim 1, wherein
   the control part is configured to run a robot program to control the operation of the arm, and
   the robot further comprises a first notifying part configured to, when the monitoring part judges that the amount of flexure exceeds the allowable range notify an operator of information showing a location in the robot program where the control part had been running at the point of time when the amount of flexure exceeds the allowable range.

4. The welding robot according to claim 1, further comprising:
   a second notifying part configured to, when the monitoring part judges that the amount of flexure exceeds the allowable range, notify an operator of a distance between (i) a position of the welding torch at the point of time when the amount of flexure exceeds the allowable range and (ii) a starting point of the welding path.

5. A welding robot, comprising:
   an arm including a plurality of links connected in series;
   a welding torch attached to a front end link among the plurality of links,
   a wire feed device attached to another link, different from the front end link, among the plurality of links,
   wherein said arm further includes one or more rotational axes located between the front end link and the another link;
   a welding cable connected to both of the wire feed device and the welding torch, and configured to hold a welding wire fed from the wire feed device to the welding torch, wherein the welding cable has a base end part connected to the wire feed device, and a front end part connected to the welding torch;
   a control part configured to control operation of the arm to move the welding torch over a predetermined welding path; and
   a monitoring part configured to judge that an amount of flexure of the welding cable caused by operation of the one or more rotational axes of the arm while the welding torch is moved over the welding path under the control of the control part is within an allowable range, when a straight line distance between the base end part and the front end part of the welding cable is a predetermined lower limit value or more.

6. The welding robot according to claim 5, further comprising: an alarm part configured to output an alarm to an operator when the amount of flexure exceeds the allowable range.

7. The welding robot according to claim 5, wherein
   the control part is configured to run a robot program to control the operation of the arm, and
   the robot further comprises a first notifying part configured to, when the monitoring part judges that the amount of flexure exceeds the allowable range notify an operator of information showing a location in the robot program where the control part had been running at the point of time when the amount of flexure exceeds the allowable range.

8. The welding robot according to claim 5, further comprising:
   a second notifying part configured to, when the monitoring part judges that the amount of flexure exceeds the allowable range, notify an operator of a distance between (i) a position of the welding torch at the point of time when the amount of flexure exceeds the allowable range and (ii) a starting point of the welding path.

* * * * *